United States Patent [19]
Xi

[11] Patent Number: 4,706,516
[45] Date of Patent: Nov. 17, 1987

[54] PEDAL MECHANISM FOR A BICYCLE HAVING THE PEDAL CRANK RADIALLY MOVABLE THEREIN

[76] Inventor: La Xi, East 101, No. 1, Gaoganlou, Haiguangsi, Peace District, Tianjing, China

[21] Appl. No.: 855,812

[22] Filed: Apr. 24, 1986

[30] Foreign Application Priority Data

Apr. 24, 1985 [CN] China .................................. 85103089

[51] Int. Cl.$^4$ ............................................. G05G 1/14
[52] U.S. Cl. .................................. 74/594.1; 74/594.3
[58] Field of Search ................. 74/594.1, 594.2, 594.3, 74/594.4

[56] References Cited

U.S. PATENT DOCUMENTS

| | | | |
|---|---|---|---|
| 653,873 | 7/1900 | Malone | 74/594.3 |
| 703,613 | 7/1902 | Robinson | 74/594.3 |
| 4,125,239 | 11/1978 | Berclaz et al. | |
| 4,281,845 | 8/1981 | Brown | 74/594.3 X |
| 4,446,754 | 5/1984 | Chattin | 74/594.3 |
| 4,519,271 | 5/1985 | Chattin | 74/594.3 |

FOREIGN PATENT DOCUMENTS

| | | | |
|---|---|---|---|
| 71498 | 2/1983 | European Pat. Off. | 74/594.3 |
| 2722004 | 11/1978 | Fed. Rep. of Germany . | |
| 871327 | 4/1942 | France | 74/594.3 |
| 2265607 | 10/1975 | France . | |
| 2365474 | 4/1978 | France . | |
| 355554 | 1/1938 | Italy | 74/594.1 |
| 611342 | 10/1960 | Italy | 74/594.3 |
| 15463 | 10/1897 | Sweden | 74/594.3 |
| 598050 | 4/1978 | Switzerland . | |
| 2050971 | 1/1981 | United Kingdom | 74/594.3 |

Primary Examiner—Andrew V. Kundrat
Assistant Examiner—Joseph A. Fischetti
Attorney, Agent, or Firm—Kenyon & Kenyon

[57] ABSTRACT

This invention relates to a pedal mechanism for a bicycle with variable leverage pedal cranks. Two guide pulley assemblies fixedly mounted on the frame of a bicycle each comprise two relatively rotatable members cooperating with an arrangement of a chain sprocket, a flange, pins and the pedal cranks so that the lengths of the cranks varies between minimum and maximum values during each rotation of the cranks. The chain sprocket has fifty-two teeth and a free wheel sprocket eighteen teeth, the driving ratio being 2.88. Owing to the variation in driving arm of the cranks, the power consumption can be lowered and speed can be increased up to 20% compared with conventional pedal mechanisms.

14 Claims, 4 Drawing Figures

PEDAL MECHANISM FOR A BICYCLE HAVING THE PEDAL CRANK RADIALLY MOVABLE THEREIN

BACKGROUND OF THE INVENTION

This invention relates to a bicycle pedal mechanism, with a variable leverage pedal crank.

French Pat. No. 2365474, German Pat. No. 272204, Swiss Pat. No. 598050, U.S. Pat. No. 4,125,239 and French Pat. No. 226507 have disclosed various pedal mechanisms with telescopically or radially movable pedal cranks. In these mechanisms, telescoping movement of a crank is obtained by arrangements of sleeves, springs, sliding pieces and the like, while radial movement of a crank is achieved by a cam, planetary gears and a guide pulley with a large circular orbit.

These mechanisms are all complicated in construction and have large frictional losses. In addition, it is hard for such mechansims to pass through the knee point generated by an eccentric mechansim used therein. For example, in French Pat. No. 2365474, since a guide pulley with a large circular orbit must be fixed on the outside of the chain sprocket in order to carry out both rotation of a pedal and radial movement of a pedal crank, the width of the bicycle in the direction of the bottom or lower bracket bearing axle is increased. The diameter of the guide pulley is 350 mm and the frictional loss is large for a bearing ball sliding on such a large orbit. Furthermore, no arrangement is provided to ensure that the pedal crank pases through the knee point generated by an eccentric mechanism thereof so that it is hard for a bicycle to start and maintain operation.

OBJECTS OF THE INVENTION

It is an object of the invention to provide a pedal mechanism which is simple in construction and has reduced frictional losses.

It is another object of the invention to provide a pedal mechanism in which the problem of starting and maintaining the operation of a bicycle is perfectly overcome.

SUMMARY OF THE INVENTION

In accordance with the invention, a pedal mechanism for a bicycle having a frame with a lower bracket bearing axle comprises a chain sprocket, a pedal crank, a cyclic variable power transmission mechanism and an auxiliary support for holding the crank relative to the chain sprocket. The chain sprocket is disposed on the bearing axle of the bicycle frame at one side of the bearing axle for rotation thereabout. The pedal crank is rotatably mounted to the bicycle frame for rotation about an axis parallel to and spaced from the bearing axle. The variable power transmission mechanism serves to transmit from the crank to the chain sprocket a moment varying in accordance with a rotational position of the crank about the axis. The power transmission mechanism includes a guide pulley assembly with an inner member and an outer member rotatably mounted to one another by a plurality of bearing balls. One of the inner member and the outer member is fixed relative to the frame while the other of the members is rotatable relative to the frame about the axis. The power transmission mechanism further includes a radially extending slot in the chain sprocket and a mechanical transmission pin connected at one end to the pedal crank and at an opposite end to the rotatable one of the two cooperating members. The mechanical transmission pin traverses the slot in the chain sprocket.

Pursuant to further features of the present invention, the inner and the outer members comprise respective rings concentrically disposed with respect to one another and having a common center spaced from the bearing axle and disposed on said axis. Preferably, the inner member is fixed to the bicycle frame and the mechanical transmission pin is pivotably connected to the outer member of the guide pulley assembly.

The auxiliary support includes a channel-like pulley pivotably mounted to the chain sprocket and engaging the crank.

In accordance with further features of the present invention, a flange member is disposed on the bearing axle at a side thereof opposite the chain sprocket for rotation about the bearing axle. Like the chain sprocket, the flange member is provided with a radially extending slot. Two pedal cranks are rotatably mounted to the bicycle frame for rotation about the axis parallel to and spaced from the bearing axle. The chain sprocket and the flange member are disposed between the two pedal cranks. The chain sprocket is juxtaposed to a first one of the pedal cranks and is spaced from a second one of the cranks. The flange member is juxtaposed to the second crank and spaced from the first crank. The guide pulley assembly constitutes a first such assembly mounted on one side of the bearing axle and disposed between the chain sprocket and the flange member. This first guide pulley assembly is juxtaposed to the chain sprocket and spaced from the flange member. A second guide pulley assembly is mounted on a side of the bearing axle opposite the first guide pulley assembly, the second guide pulley assembly being disposed between the first guide pulley assembly and the flange member. The second guide pulley assembly is juxtaposed to the flange member and spaced from the chain sprocket. Like the first guide pulley assembly, the second guide pulley assembly includes an inner member and an outer member rotatably mounted to one another by a plurality of bearing balls, one of the members being fixed relative to the frame and another of the members being rotatable relative to the frame about the axis. An additional mechanical transmission pin is connected at one end to the second pedal crank and at an opposite end to the relatively rotatable member of the second guide pulley assembly. The second mechanical transmission pin traverses the slot in the flange member. An auxiliary support is provided for supporting the flange member as well as the chain sprocket.

A pedal mechanism in accordance with the present invention has a compact construction due to the guide pulley assemblies being fixed on the inner side of the chain sprocket. Furthermore, inasmuch as the guide pulley assemblies each consist of two members rotatably mounted to each other by ball bearings disposed therebetween, when one of the two members is fixed to the frame of the bicycle and the other is rotated by mechanical transmission pins pivotably connected thereto, a kinetic inertia arises which ensures that the frictional force generated during the movement of the pedal cranks is overcome and further ensures that the pedal mechanism passes through the knee point produced by an eccentric arrangement therein, so that the effect of saving effort for bicycle riding is obtained by using the same driving force as in conventional bicycle pedal mechanisms.

DETAILED DESCRIPTION OF THE INVENTION

Figure 1:
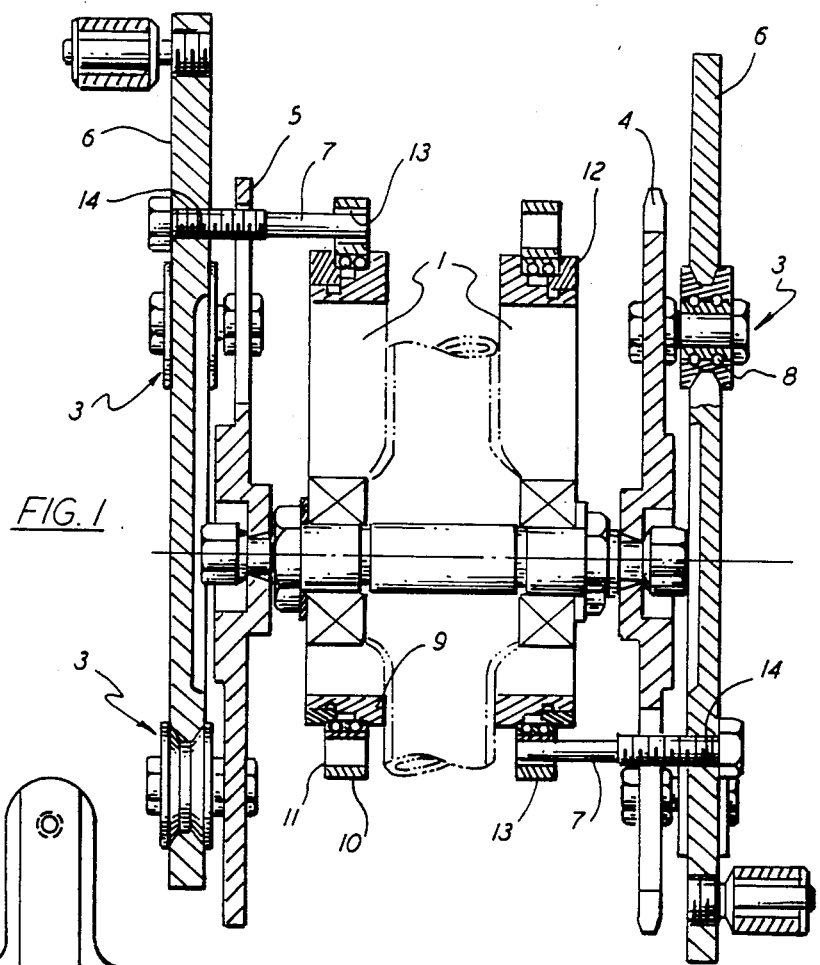
FIG. 1 is a cross-sectional view of a pedal mechanism according to the invention.
Figure 4:
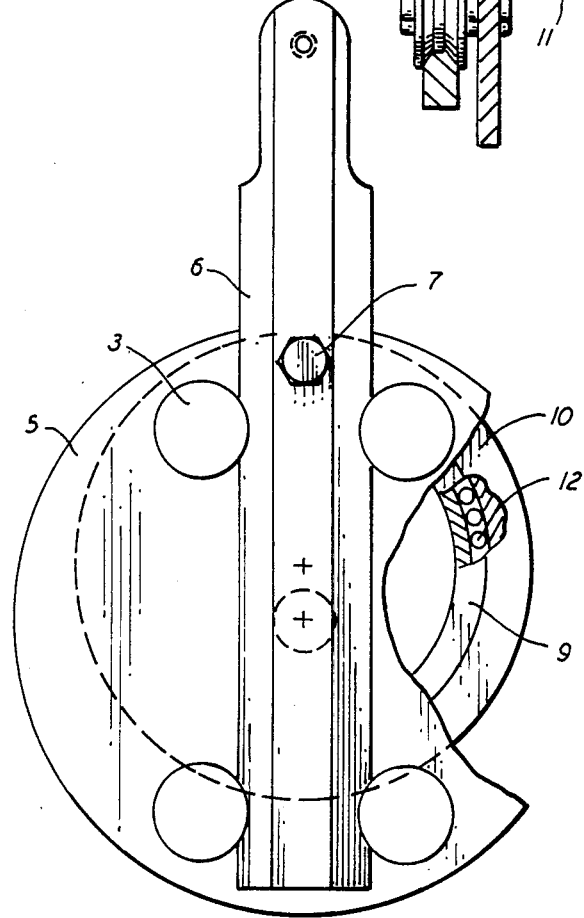
Figure 2:
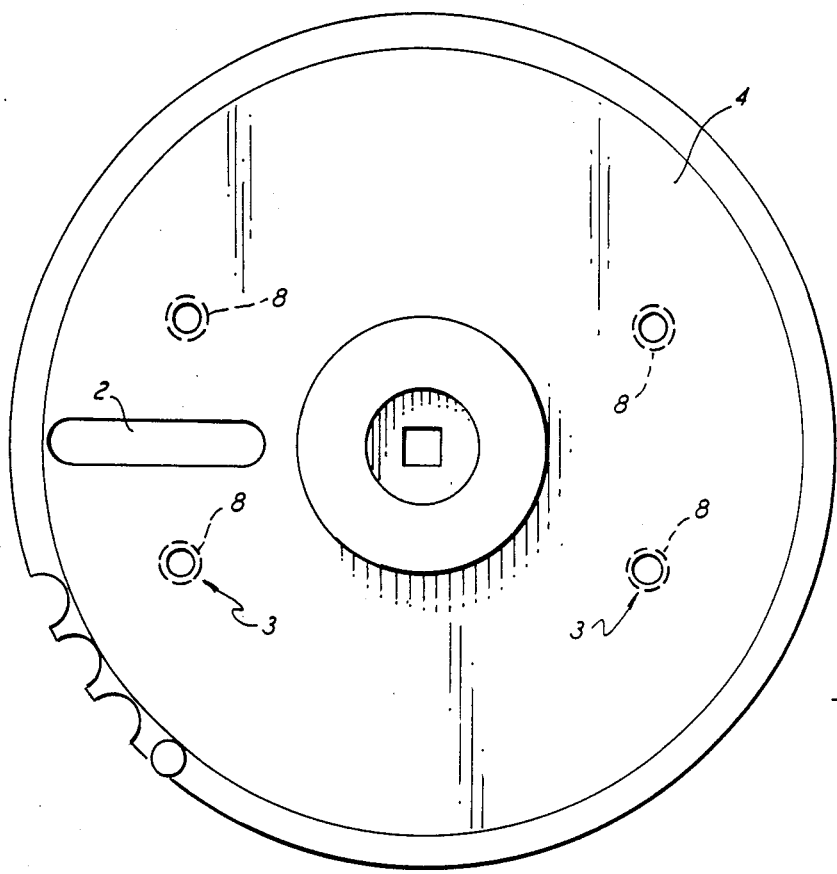
FIG. 2 is a front elevational view of a chain sprocket in the pedal mechanism of FIG. 1.
Figure 3:
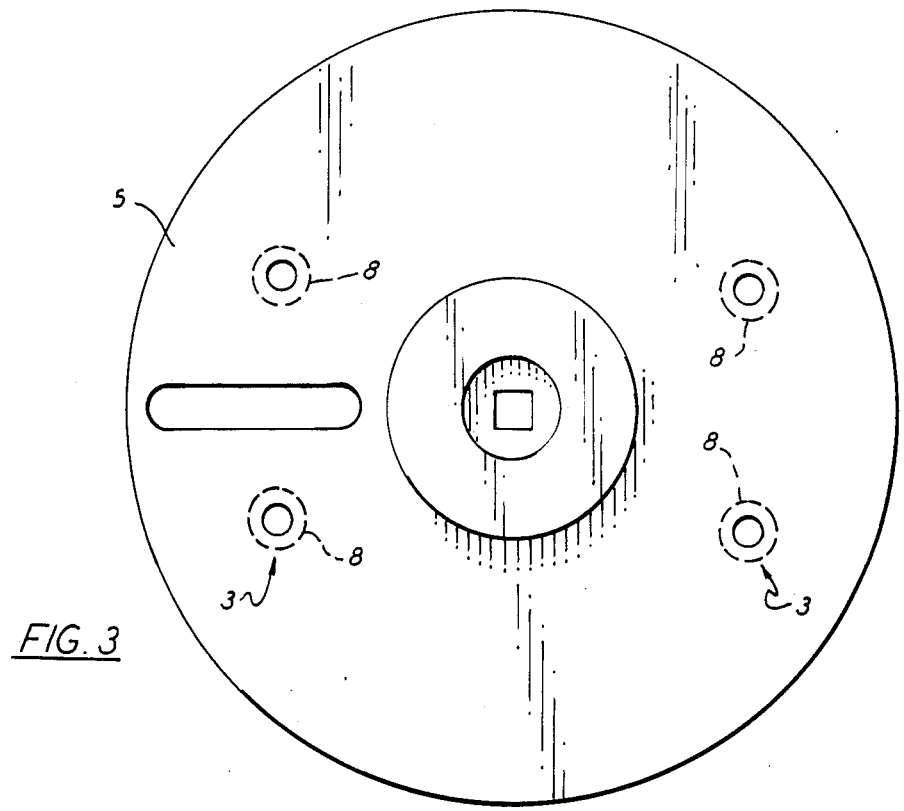
FIG. 3 is a front elevational view of a flange member in the pedal mechanism of FIG. 1.

As illustrated in FIG. 1 to FIG. 3, each of two guide pulley assemblies 1 comprises an inner ring 9, an outer ring 10 and bearing balls 12 therebetween. Either inner ring 9 or outer ring 10 is fixed on the frame of a bicycle, the center of inner ring 9 and outer ring 10 being located at a distance from the center of a bottom or lower bracket bearing axle of the bicycle, in front of the center of the bottom bracket bearing axle so that 50-80 mm of additional crank length can be obtained. Either inner ring 9 or outer ring 10 is provided with at least one pinhole 13 in which a pin can be pivotally received. Preferably, the inner ring 9 is fixed to the frame of a bicycle and the outer ring 10 is provided with a plurality of pinholes 13 and the center of inner ring 9 is spaced forwardly from the bottom bracket bearing axle by a distance of 25 mm.

Each pedal crank 6 has at least one threaded pinhole 14 with an inner screw-type thread to which a pin 7 is fixed. The shapes of cranks 6 correspond to each other and so do the shapes of two channel-like pulleys 8 in respective auxiliary supporting arrangements 3 provided on chain sprocket 4 and flange member 5, respectively. Preferably, two threaded pinholes are provided on cranks 6 each of which has a transverse cross-section meshing with the respective channel-like pulley 8. One end of each pin 7 is inserted into a pinhole 13 on either outer ring 10 or inner ring 9 of a respective guide pulley assembly, the other end of each pin being fixed by means of a thread thereon, as shown in FIG. 1.

A chain sprocket 4 is provided with a radially extending slot 2 which terminates adjacent to the base of the sprocket teeth, as shown in FIG. 2. The chain sprocket has 52-82 teeth and is connected to the auxiliary arrangements 3 each of which includes at least one pair of channel-like pulleys 8 fixed on the chain sprocket by center axles. Preferably, a chain sprocket 4 having 52 teeth, a slot 2 and two pairs of channel-like pulleys 8 disposed symmetrically about the center line of the slot and the chain sprocket (see FIG. 2) may be used as the auxiliary arrangements 3.

FIG. 3 is a front elevational view of a flange member 5 in a pedal mechanism according to the invention. Flange member 5 has a radially extending slot and auxiliary supporting arrangements 3 which are the same as those on the chain sprocket described above.

According to the construction of the invention, when a pedal crank 6 is rotated, the distance between the axis of the respective pin 14, which extends parallel to the axis of the bottom bracket bearing axle, and the axis of bottom bracket bearing axle, i.e., the arm of force or moment arm of the crank relative to its center of rotation, varies during the rotation of the pedal crank. This variation arises because the crank 6 is rotated by pin 7 around outer ring 10 which in turn is rotated around inner ring 9 fixed on the frame of a bicycle, and because the guide pulley assembly constituted by the outer ring 10, inner ring 9 and bearing balls 12 is eccentric, the pin 7 sliding in the radial direction of the crank in the slot 2 of chain sprocket 4 or flange member 5 during the rotation of the crank, so that the moment for driving the chain sprocket varies in accordance with the angle of rotation of the crank. Therefore, each guide pulley assembly should be designed so that the lever arm of the crank relative to its center of rotation is longer when the pedal crank is in a position where it can not effectively be operated in a conventional pedal mechanism and then becomes shorter due to the eccentric effect of the guide pulley assembly to save effort for bicycle riding. Further, since the bearing balls are provided between the outer ring 10 and inner ring 9 of each guide pulley assembly, it is possible for the crank to easily pass through the knee point generated by the eccentric of the guide pulley by the kinetic inertia of the crank.

The pedal mechanism according to the invention is preferably mounted on a bicycle frame in which the chain sprocket has 52 teeth, the free wheel sprocket has 18 teeth and driving ratio is 2.88. In this case, the driving lever arm varies in the range of 50 to 80 mm, whereby power consumption can be lowered and operation speed can be increased up 20% compared with conventional pedal mechanisms.

Although the present invention is explained hereinabove with reference to a particuilar embodiment, it should be understood that any modification or change in construction can be made without departing the spirit and scope of the invention defined by appended claims.

I claim:

1. A pedal mechanism for a bicycle having a frame with a lower bracket bearing axle, comprising:
   a chain sprocket disposed on the bearing axle at one side thereof for rotation about said bearing axle;
   a pedal crank rotatably mounted to the bicycle frame for rotation about an axis parallel to and spaced from said bearing axle;
   cyclic variable power transmission means for transmitting from said crank to said chain sprocket a moment varying in accordance with a rotational position of said crank about said axis, said power transmission means including a guide pulley assembly with an inner member and an outer member rotatably mounted to one another by a plurality of bearing balls, one of said inner member and said outer member being fixed relative to said frame and another of said inner member and said outer member being rotatable relative to said frame about said axis, said power transmission means further including a radially extending slot in said chain sprocket and a mechanical transmission pin connected at one end to said pedal crank and at an opposite end to said other of said inner member and said outer member, said mechanical transmission pin traversing said slot; and
   auxiliary means for supporting said crank relative to said chain sprocket.

2. A pedal mechanism according to claim 1 wherein said inner member and said outer member comprise respective rings concentrically disposed with respect to one another, said rings having a common center spaced from said bearing axle and disposed on said axis.

3. A pedal mechanism according to claim 1 or 2 wherein said inner member is fixed to said frame and said mechanical transmission pin is pivotably connected to said outer member.

4. A pedal mechanism according to claim 1 wherein said auxiliary means includes a channel-like pulley pivotably mounted to said chain sprocket and engaging said crank.

5. A pedal mechanism according to claim 1 wherein said slot extends to the base of teeth on said chain sprocket.

6. A pedal mechanism according to claim 1 wherein said mechanical transmission pin is threadedly mounted to said crank.

7. A pedal mechanism according to claim 6 wherein said pin is provided at one end with a screw-type thread meshing with a cooperating screw-type thread in a pinhole in said crank.

8. A pedal mechanism for a bicycle having a frame with a lower bracket bearing axle, comprising:
  a chain sprocket disposed on the bearing axle at one side thereof for rotation about said bearing axle, said chain sprocket being provided with a first radially extending slot;
  a flange member disposed on said bearing axle at a side thereof opposite said chain sprocket for rotation about said bearing axle, said flange member being provided with a second radially extending slot;
  a first pedal crank and a second pedal crank rotatably mounted to the bicycle frame for rotation about an axis parallel to and spaced from said bearing axle, said chain sprocket and said flange member being disposed between said first pedal crank and said second pedal crank, said chain sprocket being juxtaposed to said first pedal crank and spaced from said second pedal crank, said flange member being juxtaposed to said second pedal crank and spaced from said first pedal crank;
  a first guide pulley assembly mounted on one side of said bearing axle, said guide pulley assembly being disposed between said chain sprocket and said flange member, said guide pulley assembly being juxtaposed to said chain sprocket and spaced from said flange member, said guide pulley assembly including a first inner member and a first outer member rotatably mounted to one another by a plurality of bearing balls, one of said inner member and said outer member being fixed relative to said frame and another of said first inner member and said first outer member being rotatable relative to said frame about said axis;
  a second guide pulley assembly mounted on a side of said bearing axle opposite said first guide pulley assembly, said second guide pulley assembly being disposed between said first guide pulley assembly and said flange member, said second guide pulley assembly being juxtaposed to said flange member and spaced from said chain sprocket, said second guide pulley assembly including a second inner member and a second outer member rotatably mounted to one another by a plurality of bearing balls, one of said second inner member and said second outer member being fixed relative to said frame and another of said second inner member and said second outer member being rotatable relative to said frame about said axis;
  a first mechanical transmission pin connected at one end to said first pedal crank and at an opposite end to said other of said first inner member and said first outer member, said first mechanical transmission pin traversing said first slot;
  a second mechanical transmission pin connected at one end to said second pedal crank and at an opposite end to said other of said second inner member and said second outer member, said second mechanical transmission pin traversing said second slot; and
  auxiliary means for supporting said flange member and said chain sprocket.

9. A pedal mechanism according to claim 8 wherein said first inner member and said first outer member comprise respective rings concentrically disposed with respect to one another, said rings having a common center spaced from said bearing axle and disposed on said axis, said second inner member and said second outer member comprising respective additional rings having a common center spaced from said bearing axle and disposed on said axis.

10. A pedal mechanism according to claim 8 wherein said first inner member is fixed to said frame and said first mechanical transmission pin is pivotably connected to said first outer member, said second inner member being fixed to said frame and said second mechanical transmission pin being pivotably connected to said second outer member.

11. A pedal mechanism according to claim 8 wherein said auxiliary means includes a first channel-like pulley pivotably mounted to said chain sprocket and engaging said first crank and a second channel-like pulley pivotably mounted to said flange member and engaging said second crank.

12. A pedal mechanism according to claim 8 wherein said first slot extends to the base of teeth on said chain sprocket.

13. A pedal mechanism according to claim 8 wherein said first mechanical transmission pin is threadedly mounted to said first crank and wherein said second mechanical transmission pin is threadedly mounted to said second crank.

14. A pedal mechanism according to claim 13 wherein each of said first mechanical transmission pin and said second mechanical transmission pin is provided at one end with a screw-type thread meshing with a cooperating screw-type thread in a pin hole provided in the respective crank.

* * * * *